United States Patent [19]
Dencs et al.

[11] 4,370,198
[45] Jan. 25, 1983

[54] METHOD AND APPARATUS FOR THE RECOVERY OF THE SOLID MATERIAL CONTENT OF SOLUTIONS AND/OR SUSPENSIONS AS GRANULES IN A GAS FLUIDIZED BED

[75] Inventors: Béla Déncs; Zoltán Ormós; Károly Pataki, all of Veszprém, Hungary

[73] Assignee: Mta Muszaki Kemiai Kutato Intezet, Veszprem, Hungary

[21] Appl. No.: 130,038

[22] Filed: Mar. 13, 1980

[51] Int. Cl.³ .................................................. B01D 1/18
[52] U.S. Cl. ........................ 159/48.1; 159/DIG. 3; 159/4 CC; 159/16 R; 241/57
[58] Field of Search ............ 159/DIG. 3, 4 CC, 16 R, 159/48 R; 422/139, 141, 142, 143, 146, 144; 201/31; 34/57 A, 57 D, 10, 57 R; 241/57

[56] References Cited

U.S. PATENT DOCUMENTS

| | | | |
|---|---|---|---|
| 2,309,036 | 1/1943 | Beardsley | 241/58 |
| 3,202,731 | 8/1965 | Grevenstuk et al. | 159/4 CC |
| 3,348,819 | 10/1967 | McIlvaine | 241/57 |

FOREIGN PATENT DOCUMENTS

| | | | |
|---|---|---|---|
| 2317129 | 10/1974 | Fed. Rep. of Germany | 159/DIG. 3 |
| 1381505 | 1/1975 | United Kingdom | 159/DIG. 3 |

*Primary Examiner*—Norman Yudkoff
*Attorney, Agent, or Firm*—Young & Thompson

[57] ABSTRACT

Method and apparatus for the recovery of the solid material content of solutions and/or suspensions as granules in a gas fluidized bed which contains particles, the composition of which is identical with that of the solid material in the solution and/or suspension to be processed, in which fluidized bed the solution and/or suspension is sprayed onto the surface and/or interior of the hot gas, especially hot air fluidized layer, and from which fluidized bed particulate material is continuously withdrawn at a mass flow rate corresponding to the solid material content of the liquid phase sprayed in, and also, in which system a grinding mechanical effect is created by forcing continuously particles formed in the fluidized bed through at least one slit of controllable clearance, located in the fluidized layer, itself, in order to produce in a single technological step, in a single apparatus particulate material of predetermined, given particle size distribution.

The apparatus disclosed in the present invention has, inside the fluidized bed, in the fluidized layer itself, a slit-forming device consisting of free rolling rollers and a grinding surface, said rollers advantageously being periodically rotated with respect to the grinding surface.

12 Claims, 7 Drawing Figures

METHOD AND APPARATUS FOR THE RECOVERY OF THE SOLID MATERIAL CONTENT OF SOLUTIONS AND/OR SUSPENSIONS AS GRANULES IN A GAS FLUIDIZED BED

This invention relates to a method and apparatus for the removal of the solid material content of solutions and/or suspensions as granules in a gas fluidized bed, said method comprising spraying of the dissolved and-/or suspended material onto the surface and/or interior of a hot gas fluidized bed consisting of granules formed of the material to be recovered itself, and also comprised of a continuous discharge step whereby the particulate material is removed from the fluidized bed at a mass flow rate corresponding to the dissolved material content of the solution and/or suspensions sprayed into the fluidized bed. The apparatus according to the present invention contains a fluidization compartment, at least one sprayer, at least one solid material feeding means and at least one solid material discharging means.

In general multistep technologies are used to recover the solid material content of solutions and/or suspensions. A minimum of three successive steps are required for the removal of an easy-to-crystallize material from its solutions: crystallization, separation (filtration) and drying. If the particle size distribution of the solid product thus obtained does not/or only partially satisfies the requirements, several further steps might be required to complete the technology. Such steps might include, among others the separation and recirculation to the crystallizer of the undersize particles (either as dissolved material or as crystallization nuclei) and the grinding of the oversize particles. Frequently, the amount of the undersize fraction is considerable or due to characteristics of the crystallization technology only microcrystalline material can be produced. Therefore, frequently an additional operation—granulation—is required to secure the particle size characteristics required. In the case of a dilute solution the crystallization step is preceeded by an evaporation step as well.

Spray-drying is frequently used for the recovery of the total solid content of solutions and/or suspensions which can be sprayed. However, the particle size of the solid material produced by spray-drying is extremely small (generally in the 10-400 μm range) and frequently another step, granulation, has to be applied to obtain the particle size distribution sought. Also, spray-drying is economical only with concentrated solutions. Therefore, frequently, a concentration step preceeds the spray-drying step proper. Thus, spray-drying is frequently only one of the elements of a successful technological chain.

Naturally, apart from the examples cited above a number of other technologies are also used for the recovery of dissolved materials. However, most of these technologies consist of many steps. The same applies to most of the technologies used to recover the solid content of suspensions (such complex methods include, e.g. filtration—drying—grinding or granulation spray-drying-granulation, etc.).

Recently, fluidization has been used more frequently for the recovery of the solid material content of solutions or suspensions in the form of granules. This process, unlike the multistep technologies, allow for the continuous production, in a single technological step (in one apparatus), of granules from solutions or suspensions.

Particle formation from solutions or suspensions in a gas fluidized bed (i.e. direct particle formation) occurs as follows. Particulate material is fluidized in a continuous fluidization bed with hot gas. The composition of the particulate material forming the bed is identical with that of the dissolved (or suspended) material. The solution to be processed is sprayed onto the surface of the fluidized layer (or into the fluidized layer itself). The droplets impinge upon the surface of the continuously moving particles. The hot fluidizing gas removes the solvent (or suspending liquid) from the surface of the particles, the solvent vapours leave the system along with the hot fluidizing gas. The solid material content of the solution (suspension) remains in the fluidized bed sticking to the surface of the particles. The offtake of the particulate material from the apparatus is continuous, its mass rate corresponds to the solid material content of the liquid to be processed.

The analysis of the costs of the direct particle formation process showed that direct particle formation was more economical than spray-drying when the amount of water to be evaporated was less than 580 kg/h. Also, the capital costs of the fluidization apparatus were only half of the spray drying unit. The analysis of equal capacity units showed the space requirements—and correspondingly the extent of the supporting investment (building, structures, etc.) were also much smaller in the case of the fluidization system (Christmann, G., Chem. Anlagen Verfahren 1, 42–43, 1973; Kaspar. J., Rosch, M. Chem. Ing. Techn. 45, 746–739 /1973/). As regards the comparison of the economics of the two processes it should be noted that the particle size distribution of the products obtained by the two different methods is very dissimilar. Additional granulation has to be applied after the spray drying step to get a product with a particle size distribution similar to that of the direct particle formation process. The costs of this additional granulation step were not accounted for in the economical analysis.

The basic precondition of the industrial application of the direct particle formation process is the establishment of steady-state operation conditions, and first of all, the establishment of a steady-state particle size distribution. In the fluidized bed the size of the particles increases continuously as solid material is deposited on them from the solution (suspension). This type of particle growth is called surface layering. At the same time the particles, whose surface is wetted by the liquid sprayed, agglomerate. This results in a very rapid particle size growth rate. The common principle of all published methods used to achieve a steady-state particle size distribution is based on the observation that the above mentioned processes can be countered by the continuous introduction of small particles (the so-called base-particles).

In practice the most widespread method is the particle addition method. In the most simple cases a part of the granules leaving the apparatus is continuously recirculated into the fluidized bed, either directly (German Pat. No. 2 363 334), or after grinding (V. F. Volkov et al. Khim. Prom. 42, 450–453, 1966). More advantageously the granules withdrawn from the apparatus are fractionated and only the undersize fraction is returned (N. A. Sahova et al., Khim. Prom. 44, 446–448, 1966; 49, 299–301, 1973; 49, 690–694, 1973; J. Kaspar, M. Rosvh. Chem. Ing. Tech. 45, 736–739, 1973). Another method of equal practical importance provides for the grinding of the oversize fraction and this ground material is returned to the fluidized bed (British Pat. No. 1,381,480). A known and frequently used method applies the combination of the above two methods, i.e. the undersize fraction is returned directly, the oversize fraction is grinded and fractionated, and the undersize fraction obtained here is also returned to the fluidized bed (German Patent 2 263 968 and U.S. Pat. No. 3,475,132).

Another, less widespread method achieves the steady-state particle size distribution by making use of the fragmentation caused by the changes of the surface temperature of the particles (O. M. Todes, Krist. Tech. 7, 729–753, 1972). The principle of the phenomenon is as follows. The particle from the relatively "dry" zone of the fluidized bed enters the spraying zone where it contacts the sprayed liquid, the temperature of which is much lower than that of the particle. Thus, the surface of the particle is subjected to a sudden cooling effect. Due to the temperature and heat expansion differences between the surface and the interior of the particles degradation takes place. In certain cases this method alone proved sufficient to maintain a steady-state particle size distribution (V. V. Kozlovskij et al. Khim. Prom. 46, 1122–123, 1970; S. P. Nalimov et al. Zh. Prikl. Khim. 43, 581–586, 1970).

Both of the above methods used to achieve a steady-state particle size distribution have serious drawbacks. Various additional feeding devices are required for the particle addition technique, such as, e.g. continuous solid particle feeder, continuous and variable grinder, pneumatic or other mechanical transfer units, etc. Nevertheless, the steady-state particle size distribution can be controlled only within a relatively narrow range. Thus, the process is not suitable for the production of granulated material of changing particle size requirements. Also, the decrease of productivity caused by the recirculation of the solid material should not be neglected either. The rate of the particle size disintegration processes caused by the surface temperature fluctuations is sufficient for a steady-state particle size distribution only at high layer temperatures (180°–250° C.). This factor significantly restricts the range of materials which can be processed by this method, because components which melt or decompose at this bed temperature or below cannot be recovered. Another disadvantageous feature of the high bed temperature is the high energy consumption and low productivity rate.

The present invention relates to a granulating method and apparatus by which particulate material can be produced from solutions or suspensions in a single continuously operated gas fluidized bed, said method being characterized by a steady-state—and controlled as required—particle size distribution, without recourse to additional post-granulation operations such as fractionation, grinding, partial recirculation, etc.

The above technological aim can be realized by applying such a method and apparatus which forces the particles floating in the fluidized layer through at least one opening of preselected size, and located in the fluidized layer itself thereby exerting a mechanical grinding effect. By creating and maintaining a directed relative motion between the particles floating in the fluidized bed and the slit(s) arranged in the fluidized layer the particles can be forced through the(se) slit(s).

The key principle of the present invention postulates that the base particles required for the establishment and control of the steady-state particle size distribution can be created in the fluidized bed itself by subjecting the particles present in the fluidized layer to a grinding mechanical effect.

In other words the essence of the present invention is that the particle size growth processes (surface layering, agglomeration), which take place in the fluidized bed once the solution or suspension to be processed is introduced can be compensated in the fluidized bed itself, in order to achieve a controlled, steady-state particle size distribution, by creating such a special, mechanical grinding effect, which can be readily regulated, whereby the maximum particle size and the particle size distribution of the material produced can be controlled within a relatively wide range.

Advantageously, the particles formed and floating in the fluidized bed are forced through slit(s) of varying position located in the fluidized layer itself. Advantageously, the relative position of the slit(s) is changed periodically, e.g. via rotation, in a given section of the fluidized bed, advantageously the lower section of the fluidized layer. The particles which enter this portion of the fluidized bed are continuously forced to pass through the(se) slit(s). Correspondingly, particles greater and in certain cases even smaller than the opening of the slit(s) are necessarily ground.

The apparatus according to the present invention has at least one slit-forming device inside the fluidized bed, within the fluidization itself, said slit-forming device advantageously having at least one degrading element and at least one roller element advantageously the axis of said roller element being parallel with the degrading element and its distance from it being variable. Advantageously, the surface of the degrading surface and/or the roller(s) is rough, e.g. knurled. The nominal value of the distance between the roller(s) and the degrading element is set by the slit-clearance setting means according to the required particle size distribution. In order to prevent overloading or breakage of the slit system it has such a design that upon exceeding a preset limiting force the clearance between the degrading element and the roller(s) can be temporarily increased. By applying a back-folded plate-agitator the grinding efficiency towards the larger particles can be increased and occasional fluidization irregularities can be avoided.

The advantages of the method and apparatus described in the present invention can be summarized as follows:

Contrary to the known multistep technologies the solid material content of solutions and suspensions can be recovered in a single step, in a continuous fluidization apparatus and the granules produced have the physical characteristics (particle size distribution, moisture content) required for the end use.

One of the greatest advantages of the operation is that the steady state physical characteristics (particle size distribution, moisture content) of the solid material produced are controlled and maintained in the fluidization bed itself. There is no need for a post-fluidization treatment (such as fractionation, grinding, solid-material transport and feed, etc.) of the produced granulated material. Therefore, the apparatus used in the process, and especially the operation of the apparatus, is extremely simple. Simultaneously, the specific productivity of the apparatus increases because there is no need for the partial recirculation of the product, nor for high temperatures. Accordingly, both the capital and the operation costs of the apparatus decrease significantly (accounting for the costs of the grinding element and its motor as well).

The particle size of the product can be reliably controlled by simple means (number and size of the rollers, opening of the slit) over a relatively wide range: 0.2–5.0 mm. The particle size of the product can be continuously changed, even during the run, by decreasing or increasing the rotation speed of the grinding element. The particle size of the main portion (about 90 % w/w) of the product granules is in a very narrow range 0.2–0.8, 0.6–1.6, 1–2.5 mm, depending on the grinding parameters selected. This feature is extremely advantageous from the point of view of further processing or utilization.

The applicability of the process is not limited by the physical characteristics of the materials to be processed (e.g. by low melting point or decomposition temperature).

The process can be used in a number of fields of chemical and related industries for the production of intermediates and final products. Such, but by no means limiting fields of application are, for example the following: recovery of active material from pharmaceutical solutions, preparation of granules, ready for final processing, containing both the active component and the carrier; preparation of particulate insecticides and herbicides or end products containing both the active component(s) and the carrier; recovery of enzymes in granulated form from fermentation broths; production of single or multicomponent fertilizer granules; recovery of various inorganic salts; recovery from suspensions in granulated form of the raw materials or mixtures of the raw materials used for the production of telecommunication ceramics; preparation of various food products (e.g. granulated instant cocoa). Naturally, the above list is by no means exclusive or restrictive.

The essence of the method and apparatus of the present invention is further explained below with reference to the drawings enclosed and the examples discussed.

FIG. 1 presents the flowsheet of a form of the apparatus and the advantageous arrangement of the ancilliary equipment according to the present invention.

Figure 3:
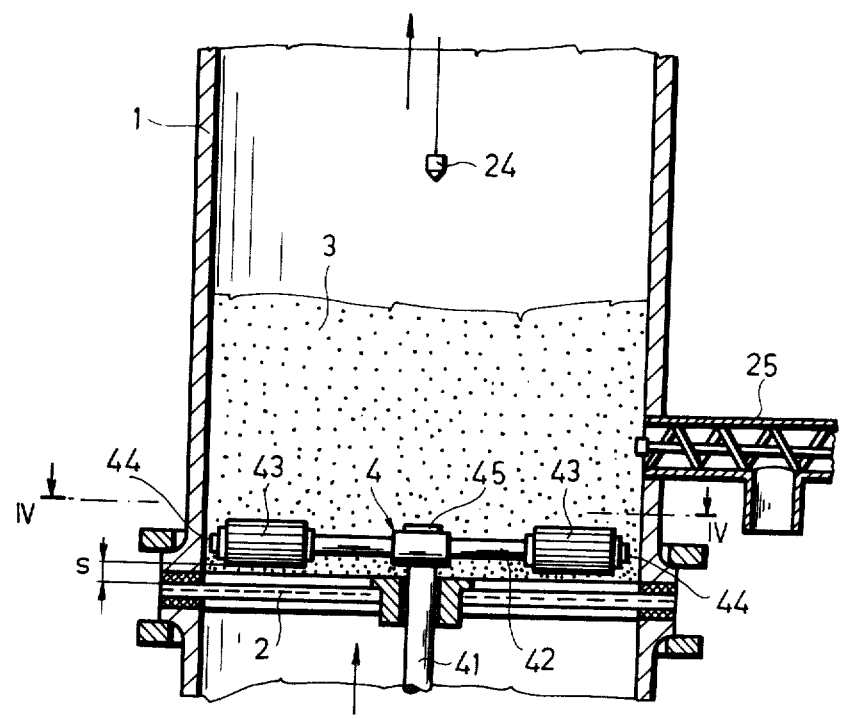
FIG. 3 shows the cross-section view of another possible form of the slit-forming device.
Figure 5:
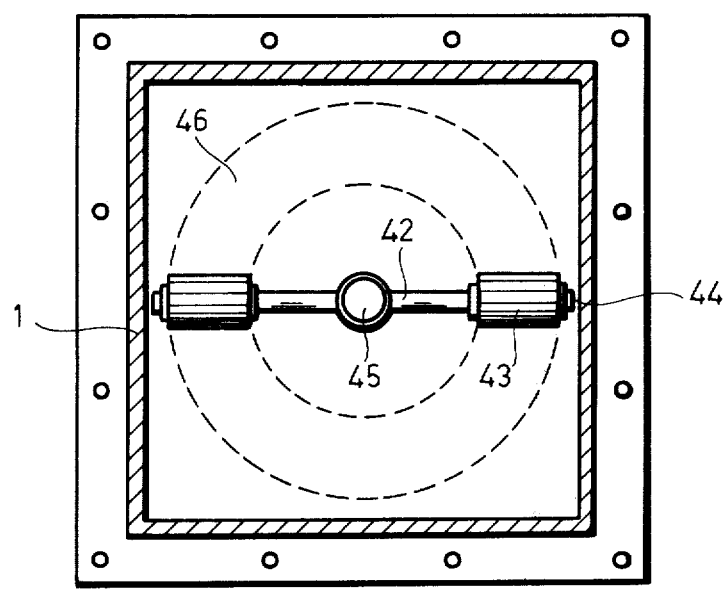

FIG. 5 presents the cross-section view of a square cross-section apparatus along plane IV—IV in FIG. 3.

Figure 2:
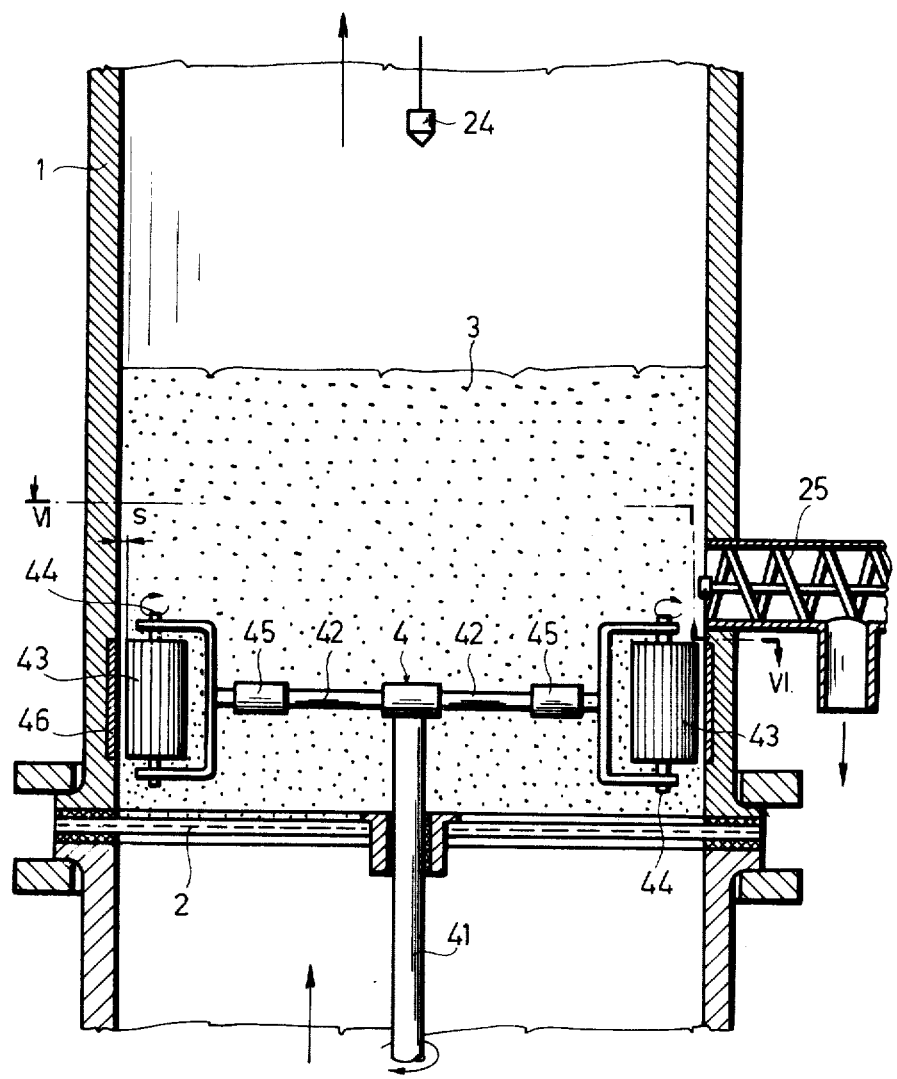
FIG. 2 shows the cross-section view of the fluidization cell and the slit-forming device according to the present invention.
Figure 6:
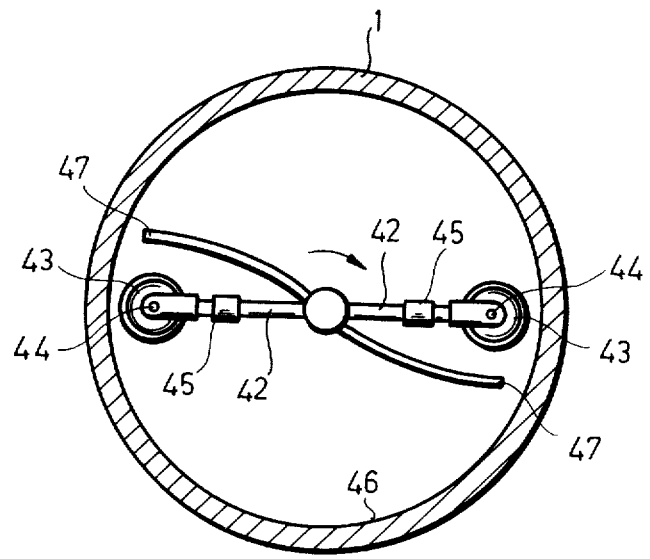

FIG. 6 shows the cross-section view along plane IV—VI in FIG. 2 of a verson of the apparatus shown in FIG. 2 equipped with an additional blade mixer as well.

Figure 7:
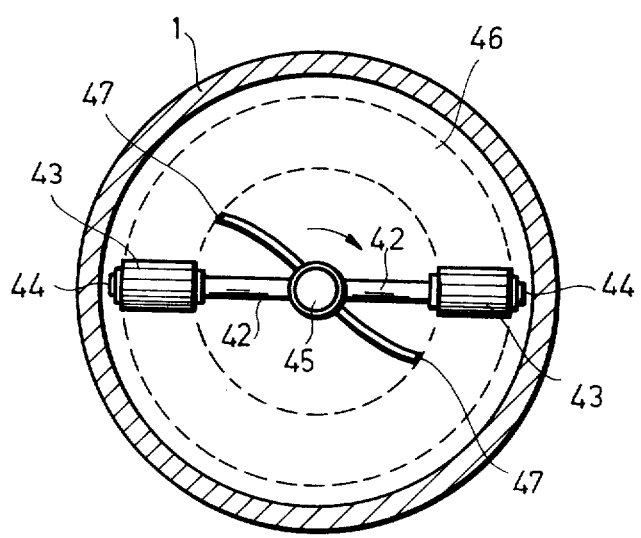

FIG. 7 shows the cross-section view along plane IV—IV in FIG. 3 of the apparatus shown in FIG. 3 equipped with an additional blade mixer as well.

Figure 1:
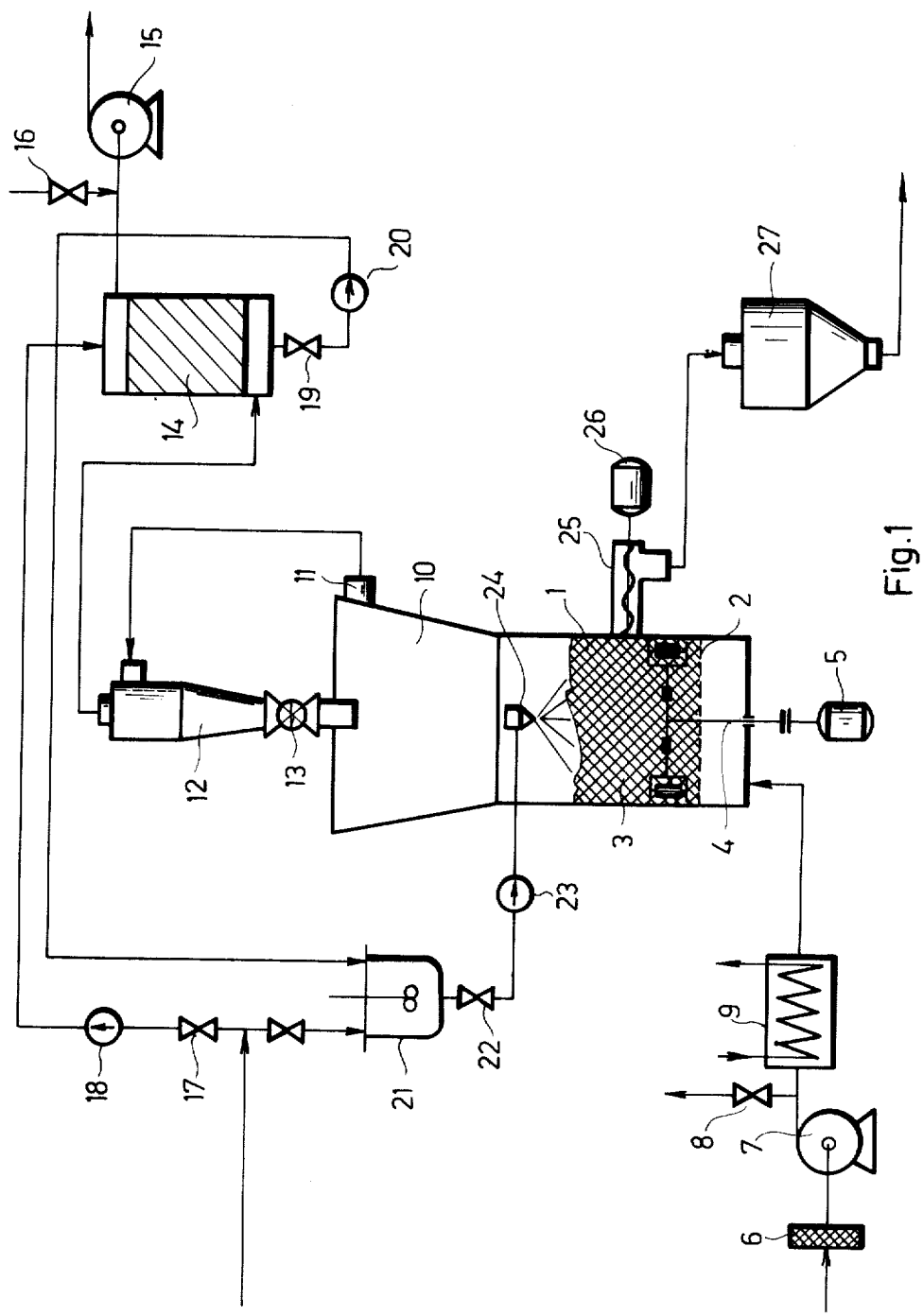

The solid material content of solutions or suspensions can be recovered in steady-state conditions as granules of a given or required particle size distribution by the method disclosed in the present invention as exemplified in FIG. 1. In cylindrical fluidized bed 1 the fluidized layer of the particulate material 3 is located above supporting and air distributing plate 2. The chemical composition of the particles present in the layer is identical with that of the solid material to be recovered from the solutions or suspensions. The slit-forming device 4 including rollers 43 is disposed in the lower section of fluidized layer 3. The slit-forming device is rotated by a variable speed electric motor 5. Fluidizing air which carries the solvent vapours away is pumped through air filter 6 by fan 7 and after passing heat exchanger 9 it enters the fluidized bed. Air flow rate is controlled by gate value 8. Hot air passes air distributor 2 and fluidizes the particulate material forming fluidized layer 3. Air leaving fluidized layer 3 enters conical air-space 10 where its linear velocity decreases. Air is exhausted from the fluidization apparatus via port 11. Dust separation from the exhausted air is achieved in cyclone 12. Dust separated in cyclone 12 is fed back continuously by compartment feeder 13 into the fluidized bed. Secondary removal, if required and warranted by environmental pollution regulations, is achieved in continuous wet-scrubber 14. The scrubbing liquid used in wet scrubber 14 is part of the solution or suspension to be processed. Pump 18 delivers this liquid from valve 17 into wet scrubber 14. Due to the effects of dust separated from the air and dissolved in the scrubbing liquid as well as the evaporation of the solvent, the concentration of the scrubbing liquid in wet scrubber 14 is higher than that of the incoming liquid. The scrubbing liquid leaving wet scrubber 14 is fed back by pump 20 from valve 19 into liquid tank 21 equipped with an agitator. Scrubbed air leaving wet scrubber 14 is exhausted by fan 15 with air entering through controlling gate valve 16 into the ambient. The solution or suspension stored in take 21 is delivered by pump 23 from valve 22 to sprayer 24. The spray emitted by sprayer 24 reaches the surface of fluidized layer 3. Here, under the effect of hot air, solvent evaporates and the solid material content of the solution or suspension is deposited on the surface of the particles. Particle growth processes (i.e. surface layering and agglomerization) taking place in the fluidized bed can be compensated by slit-forming device 4 in order to achieve the steady-state particle size distribution required. Product granules are discharged by worm feeder 25 driven by variable speed electromotor 26 into storage bin 27.

Another possible realization of the present invention can be described with reference to FIG. 2. The fluidization apparatus consists of vertical, cylindrical fluidization bed 1. Circular supporting and air distributing plate 2 is attached to the lower part of the cell. Main axle 41 driving slit-forming device 4 is vertically located at the center of cylindrical fluidization bed 1. Axle 41 can be driven either at its lower or upper end. The driving unit has to be constructed in such a manner that the rotation speed of axle 41 could be varied. The aim of slit-forming device 4 is the disintegration of the larger particles which are congregate in the lower section of fluidized bed 3. Therefore, advantageously the slit-forming unit is placed immediately above supporting and air distributing plate 2. As required by the given operation, slit-forming unit 4 can include one or more rollers 43. It is, however, more advantageous to use two rollers 43 or pairs of rollers 43. Rollers 43 are attached symmetrically to the suitably formed ends of arms 42. This arrangement insures the symmetrical load of axle 41. It should be noted that there are possible arrangements of slit-forming device 4 with an odd number of rollers 43 which also result in a symmetrical loading of axle 41. In the realization of the present invention discussed here rollers 43 at the end of arms 42 are supported in free-running bearings in such a manner that a slit clearance of S is formed between them and the rough, advantageously knurled grinding inner surface of fluidization bed 1. Slit-setting devices 45 allow for the setting of clearance S. Advantageously, the design of the slit-forming device allows for the change of the clearance around the preset value S depending on the size and rigidity of the particles formed in fluidized bed 3. This feature prevents the deformation or breakage of slit-forming device 4 which is equipped with rollers 43.

During the operation of the above disclosed apparatus rollers 43 move around a circle, at a distance of S away from grinding surface 46, as the result of the rotation of main axle 41. The mechanical grinding effect is due to the shear and compression forces arising between the advantageously knurled surface of rollers 43 and grinding surface 46. Meanwhile, rollers 43 can freely rotate around axles 44. The extent of grinding, and eventually, the steady-state particle size distribution is controlled by the number and size of rollers 43, the size of slit opening S and the rotation speed of main axis 41. The size of slit opening S controls, at the same time, the maximum particle size occurring in the fluidized bed. The solution or suspension is fed in and is evenly distributed on the surface of the fluidized layer by sprayer 24. The product is withdrawn by a mechanical feeder, by worm feeder 25. Worm feeder 25 is attached to the side wall of fluidization bed 1, advantageously at the middle or lower part of fluidized layer 3.

Depending on the location of grinding surfaces 46 the design of the apparatus used for the present invention can take a number of possible forms. In the apparatus shown in FIGS. 2 and 6 grinding surface 46 is located around the inner wall of cylindrical fluidization bed 1. In the case of the apparatus shown in FIGS. 3, 4 and 5 grinding surface 46 takes the form of a special, rough (e.g. knurled) annulus located at the plane of supporting and air distributing plate 2. It can also assume the role of supporting and air distributing plate 2 (e.g. a porous metal supporting plate of rough surface). The bigger particles formed in fluidized bed 3 occur mostly in its lower section, in the close vicinity of the supporting plate, so grinding surface 46 located at the plane of supporting and air distributing plate 2 ensures primarily the efficient disintegration of the largest particles. The application of grinding surface 46 in the plane of supporting and air distributing plate 2 allows for the use of not only circular fluidized beds also fluidized beds with square and rectangular cross sections (cf. FIG. 5).

In the apparatus shown in FIGS. 3, 4, 5 and 7, supporting arms 42 connected in a removable way to main axle 41 located, advantageously, but not necessarily, at the vertical center line of fluidization bed; allow for the control of the extent of mechanical stress acting upon the particles present in fluidized layer 3. Rollers 43 have horizontal axles 44 on the ends of horizontal supporting arms 42, so the latter arms act simultaneously as axles of rollers 43 as well. Thereby, the distance of rollers 43 measured from main axle 41, and also the circumferential velocity of rollers 43 can be controlled even with a constant rotation speed of the main axle. Furthermore, several rollers of equal or different size can be mounted simultaneously on supporting arms 42. The size of opening S between grinding surface 46 at the plane of supporting and air distributing plate 2 and rollers 43 can be set by slit-opening controlling device 45, which is connected either in a rigid or in a flexible manner. The particle size distribution can be controlled by the size of opening S, the rotation speed of main axle 41, the magnitude of the area of grinding surface 46, and the number and size of the rollers. Uniform feed and distribution of the solution or suspension takes place via sprayer 24 while product discharge is achieved through mechanical feeder (e.g. worm feeder) 25.

Figure 4:
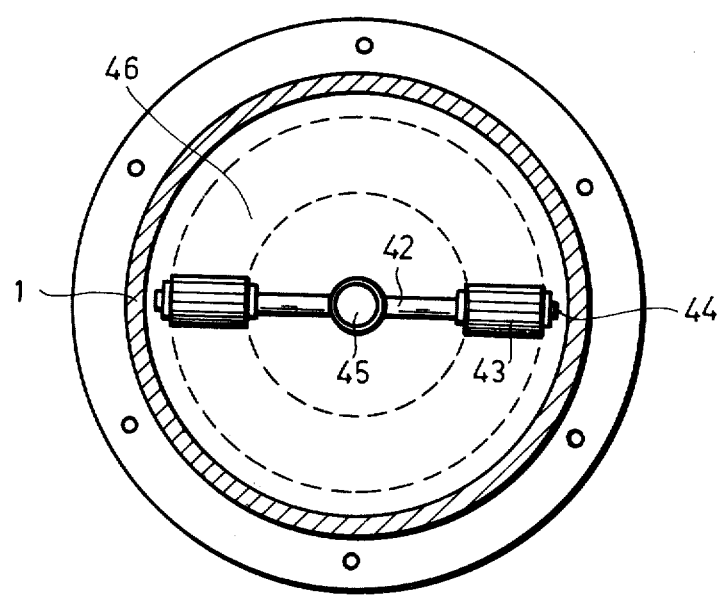
FIG. 4 shows the cross-section view along plane IV—IV, in FIG. 3.

In the apparatus disclosed in the present invention and shown in FIGS. 3, 4 and 5 slit-forming device 4 is located in the lower section of fluidized layer 3, so it effects primarily the larger particles preferring this section of the layer. The efficiency of the grinding of the larger particles present in the lower section of fluidized bed 3 can be enhanced by installing a mixing element on main axle 41 immediately above supporting and air distributing plate 2 in such a manner as to ensure that the larger particles subjected to a less intense fluidization movement enter the space between grinding surface 46 and rollers 43. Such solutions are shown in FIGS. 6 and 7. The elements already discussed in connection with FIGS. 3, 4 and 5 are designated by the same numbers.

In FIG. 6 grinding surface 46 is located along the internal wall of cylindrical fluidization bed 1. Back-folded plate agitator 47 located immediately above supporting and air distributing plate 2, and connected via a releasable joint, forces the large particles in the lower section of fluidized layer 3 away from the vertical center line of cylindrical fluidized bed 1 towards its wall equipped with grinding element 46. This action ensures that the large particles at the bottom of fluidized layer 3 meet grinding rollers 43, and simultaneously, it prevents the development of fluidization irregularities (stagnant layer, channelling) in the lower section of fluidized layer 3.

In FIG. 7 grinding surface 46 is located at the plane of supporting and air distributor plate 2. In this case the role of back-folded plate agitator is to held the large particles in front of rollers 43, onto grinding surface 46, and also to prevent the development of fluidization irregularities.

In order to further explain the present invention some, by no means limiting and restricting, Examples are given below:

EXAMPLE 1

Particulate sodium chloride is produced from a 250 g/l solution. Into a fluidized bed of 0.3 m inner diameter 15 kg particulate sodium chloride is introduced and fluidized with 100 Nm$^3$/h 120° C. hot air. The rotation speed of the slit-forming device of given size and clearance setting is set at 18 rpm. The design and location of the slit-forming device is the same as shown in FIGS. 3 and 4. The sodium chloride solution is sprayed into the fluidized bed at a 5 l/h rate. Solid material is withdrawn from the fluidized layer at a rate of 1.25 kg/h. The solid material dust (below 0.3 mm particle size) separated in the cyclone is continuously returned. The flow rate of the fluidizing gas is continuously increased up to 180 Nm$^3$/h during a period corresponding to the average residence time, some 12 hr, while air temperature is maintained at 120° C. Generally, steady-state operation conditions could be achieved in this period. The moisture content of the particulate sodium chloride removed from the apparatus is below 0.2% w/w. The sieve analysis of the product fraction yielded a particle size distribution as follows:

| particle size, mm | weight % |
| --- | --- |
| 0.2–0.4 | 9.0 |

-continued

| particle size, mm | weight % |
| --- | --- |
| 0.4–0.6 | 23.1 |
| 0.6–0.8 | 28.1 |
| 0.8–1.0 | 32.1 |
| 1.0–1.6 | 7.7 |

After a longer steady-state operation period the rotation speed of the slit-forming device was increased to 30 rpm. As in the previous case, steady state conditions could be established in 10 hrs. During this period the flow rate of air was decreased from 180 Nm³/h to 140 Nm³/h. The moisture content of the particulate material withdrawn from the fluidized bed remained 0.2% w/w, while the particle size decreased as shown by the sieve analysis data:

| particle size, mm | weight % |
| --- | --- |
| 0.1–0.2 | 2.9 |
| 0.2–0.4 | 32.0 |
| 0.4–0.6 | 34.2 |
| 0.6–0.8 | 20.2 |
| 0.8–1.0 | 8.1 |
| 1.0–1.6 | 2.6 |

EXAMPLE 2

Particulate urea was produced from a 450 g/l solution, 9 kg particulate urea (particle size, 0.6–0.8 mm) was charged into the fluidizing apparatus (internal column diameter 0.3 m) and fluidized with 80 Nm³/h 100° C. air. The rotation speed of the slit-forming device of given design was set at 12 rpm. The design and location of the slit-forming device was identical with those shown in FIG. 2. Urea solution was sprayed into the apparatus at a flow rate of 3 l/h, particulate material was discharged at a mass flow rate of 1.35 kg/h. Dust separated in the cyclones was returned into the apparatus. In a period corresponding to the average residence time of the particulate material (some 6.7 less) the air flow rate (insuring both the fluidization movement and the removal of the solvent vapours) was increased to 160 Nm³/h, while its temperature was maintained at 100° C. The moisture content of the particulate urea discharged from the apparatus was below 0.5% w/w.

The sieve analysis resulted:

| particle size, mm | weight % |
| --- | --- |
| 0.4–0.6 | 1.3 |
| 0.6–0.8 | 1.7 |
| 0.8–1.0 | 16.6 |
| 1.0–1.6 | 78.9 |
| 1.6–2.5 | 1.5 |

After a long steady-state operation period the rotation speed of the slit-forming device was increased to 30 rpm. Steady state conditions were achieved again after 6 hrs. In this period the air flow rate was decreased from 160 Nm³/h to 120 Nm³/h. The moisture content of the particulate urea product discharged from the apparatus was below 1% w/w. Its particle size decreased as shown here:

| particle size, mm | weight % |
| --- | --- |
| 0.2–0.4 | 2.1 |
| 0.4–0.6 | 23.3 |
| 0.6–0.8 | 29.5 |
| 0.8–1.0 | 38.7 |
| 1.0–1.6 | 6.4 |

EXAMPLE 3

Particulate saccharose was produced from a 700 g/l solution. 12 kg particulate saccharose (particle size 0.6–0.8 mm) was charged into the fluidized bed (inner column diameter 0.3 m) and fluidized with 130 Nm³/h 100° C. air. The rotation speed of the slit-forming device of given size and design as well as that of the back-folded plate agitator was set at 47 rpm. The design and location of both the slit-forming device and the back-folded plate agitator were identical with those shown in FIGS. 2 and 6. Saccharose solution was sprayed in at a flow-rate of 3.5 l/h, while the solid product was discharged at a mass flow rate of 2.45 kg/h. Solid dust separated from the discharged air flow was continuously returned to the fluidized bed. In a period corresponding to the average residence time of the particulate material (some 4.9 hrs) the air flow rate (insuring both the fluidization movement and the removal of the solvent vapours) was increased continuously up to 200 Nm³/h, while its temperature was maintained at 100° C. In steady-state conditions the moisture content of the particulate material was below 0.2% w/w, while its particle size distribution was as follows:

| particle size, mm | weight, % |
| --- | --- |
| 0.2–0.4 | 0.8 |
| 0.4–0.6 | 7.4 |
| 0.6–0.8 | 16.7 |
| 0.8–1.0 | 35.5 |
| 1.0–1.6 | 39.6 |

After a longer period of steady state operation the rotation speed of the slit-forming device was decreased to 30 rpm. New steady state conditions were achieved in 5 hrs. During this period the flow rate of fluidizing air was increased from 200 Nm³/h to 300 Nm³/h. The moisture content of the particulate material discharged in steady-state conditions was below 0.1 w/w. Its particle size increased as shown by the following sieve analysis:

| particle size, mm | weight % |
| --- | --- |
| 0.4–0.6 | 0.8 |
| 0.6–0.8 | 3.0 |
| 0.8–1.0 | 18.5 |
| 1.0–1.6 | 58.5 |
| 1.6–2.5 | 19.2 |

EXAMPLE 4

Particulate ferric oxide was produced from a 830 g/l suspension containing 4 g/l organic material as well. 25 kg particulate ferric oxide (particle size 0.4–0.6 mm) was charged into the fluidized bed (inner column diameter 0.3 m) and it was fluidized with 200 Nm³/h 130° C. air. The rotation speed of the slit-forming device of given size and that of the back-folded plate agitator was set at 20 rpm. The design and location of both the slit-forming device and the plate agitator were identical with those shown in FIGS. 3 and 7. The suspension was sprayed in at a flow rate of 10 l/h, while solid material was discharged at a mass flow rate of 8.34 kg/h. Dust separated from the exhausted air flow was continuously returned to the fluidized bed. In a period of some 3 hrs the air flow rate insuring both the fluidization movement and the removal of the solvent vapours was continuously increased to 300 Nm$^3$/h. The moisture content of the particulate material discharged under steady state conditions was below 0.5 w/w. The following sieve analysis resulted:

| particle size, mm | weight % |
|---|---|
| below 0.2 | 10.9 |
| 0.2–0.4 | 26.5 |
| 0.4–0.6 | 38.9 |
| 0.6–0.8 | 10.6 |
| 0.8–1.0 | 3.1 |

We claim:

1. In a method for the continuous recovery of the solid material content of liquids, in the form of granules of predetermined particle size distribution, comprising spraying a liquid having a solid material content into a fluidized bed of particles of the same solid material as that of the liquid, and continuously discharging particulate material from the bed at a rate equal to the rate of introduction of the solid material in the liquid; the improvement comprising providing in the fluidized bed a solid stationary surface, positioning a roller with its axis parallel to said fixed surface and its periphery spaced a short distance from said fixed surface so as to define a slit between said fixed surface and said periphery, and bodily moving said roller perpendicular to said axis while maintaining said slit of constant size, thereby continuously to grind said particulate material between said periphery and said fixed surface.

2. A method as claimed in claim 1, in which said fixed surface is an upright concave cylindrical surface and said axis is vertical and moves in a cylindrical path of smaller diameter than said cylindrical surface.

3. A method as claimed in claim 1, in which said fixed surface is flat and horizontal and said axis is horizontal and revolves in a horizontal plane.

4. A method as claimed in claim 3, in which said fixed surface is a multiperforate plate, and forcing gas up through said plate to fluidize said bed.

5. In apparatus for the continuous recovery of the solid material content of a liquid in the form of granules of predetermined particle size distribution, comprising a chamber adapted to confine a fluidized bed, said chamber having a perforated bottom wall and means to force gas up through said perforated bottom wall, means for spraying a liquid having a solid material content into said chamber, and means for continuously discharging particulate material from said chamber at a rate corresponding to the rate of introduction of the solid material content of the sprayed liquid; the improvement comprising at least one roller disposed in said chamber with the axis of the roller parallel to one fixed wall of the chamber, and means for continuously moving said roller in said chamber perpendicular to said axis with said axis remaining parallel to and spaced a constant distance from said wall and with the periphery of the roller spaced a constant small distance from the wall so as to define between said periphery and said wall a slit, thereby continuously to grind said particulate material between said periphery and said wall.

6. Apparatus as claimed in claim 5, said chamber being a vertical cylinder, said axis being vertical, and means for moving said axis in a cylindrical path.

7. Apparatus as claimed in claim 6, and a vertical axle concentric with said chamber, and at least one arm on said axle carrying said at least one roller.

8. Apparatus as claimed in claim 7, there being a plurality of said arms on said axle, symmetrically disposed about said axle, there being a said roller at the end of each said arm.

9. Apparatus as claimed in claim 5, said wall being horizontal, said axis being horizontal and spaced above said wall, and means for moving said axis in a circular path in a horizontal plane.

10. Apparatus as claimed in claim 9, said moving means comprising a vertical axle having an arm on the end of which said roller is disposed.

11. Apparatus as claimed in claim 10, there being a plurality of said arms on said axle symmetrically spaced apart about said axle with a said roller on the end of each said arm.

12. Apparatus as claimed in claim 9, said fixed wall being said perforated bottom wall.

* * * * *